(12) United States Patent
Bauer

(10) Patent No.: US 12,089,749 B2
(45) Date of Patent: Sep. 17, 2024

(54) UPHOLSTERY DEVICE

(71) Applicant: Wolfgang Bauer, Radolfzell (DE)

(72) Inventor: Wolfgang Bauer, Radolfzell (DE)

( * ) Notice: Subject to any disclaimer, the term of this patent is extended or adjusted under 35 U.S.C. 154(b) by 546 days.

(21) Appl. No.: 17/424,557

(22) PCT Filed: Feb. 3, 2020

(86) PCT No.: PCT/EP2020/052574
§ 371 (c)(1),
(2) Date: Jul. 21, 2021

(87) PCT Pub. No.: WO2020/161053
PCT Pub. Date: Aug. 13, 2020

(65) Prior Publication Data
US 2022/0015550 A1 Jan. 20, 2022

(30) Foreign Application Priority Data
Feb. 5, 2019 (EP) ..................... 19155596

(51) Int. Cl.
*A47C 27/15* (2006.01)
*A47C 21/04* (2006.01)
(Continued)

(52) U.S. Cl.
CPC ............ *A47C 27/15* (2013.01); *A47C 21/044* (2013.01); *A47C 27/144* (2013.01); *B68G 11/02* (2013.01); *F28D 20/023* (2013.01)

(58) Field of Classification Search
CPC ..... A47C 21/046; A47C 21/048; A47C 27/15; A47C 27/144; A47C 31/105; B68G 11/02;
(Continued)

(56) References Cited

U.S. PATENT DOCUMENTS 2,639,444 A * 5/1953 Estelle ................. A47C 31/105
5/699
3,170,172 A * 2/1965 Kessman ................. A47C 1/14
5/656
(Continued)

FOREIGN PATENT DOCUMENTS

CN 201709884 U 1/2011
CN 102228352 A 11/2011
(Continued)

*Primary Examiner* — Justin C Mikowski
(74) *Attorney, Agent, or Firm* — Smartpat PLC

(57) ABSTRACT

An upholstery device has a top face, a bottom face and, between top face and bottom face, sides walls extending around the outer circumference. A cover layer surrounds the top face, the side walls and/or the bottom face. A cushioning layer is arranged under the top cover layer. The cover layer is light-transmissive. The cushioning layer is also light-transmissive. A heat-absorbing flexible absorber layer is arranged underneath the cushioning layer. A solar thermal storage layer is operatively connected to the absorber layer and arranged underneath or above the absorber layer and has phase change material, or PCM. Alternatively, a functional layer with a solar thermal storage layer made of integrated, solar thermal phase change material, or PCM, is arranged underneath the cushioning layer at least in certain regions, in particular over the whole surface, wherein the functional layer has in particular an absorber layer.

23 Claims, 4 Drawing Sheets

(51) Int. Cl.
*A47C 27/14* (2006.01)
*B68G 11/02* (2006.01)
*F28D 20/02* (2006.01)

(58) Field of Classification Search
CPC ......... B68G 7/05; A47G 9/0238; Y02E 60/14; F28D 20/023
See application file for complete search history.

(56) References Cited

U.S. PATENT DOCUMENTS

| | | |
|---|---|---|
| 4,980,936 A | 1/1991 | Frickland et al. |
| 2004/0237206 A1 | 12/2004 | Webster et al. |
| 2009/0288259 A1 | 11/2009 | Ean et al. |
| 2010/0287708 A1* | 11/2010 | Shelby .................. A47C 27/121 5/737 |
| 2011/0154575 A1* | 6/2011 | Kiser ................... A47C 27/002 5/724 |
| 2015/0296994 A1* | 10/2015 | Mikkelsen ........... A47C 21/046 5/655.4 |
| 2016/0107343 A1 | 4/2016 | Losio et al. |
| 2016/0166074 A1 | 6/2016 | Rose et al. |
| 2017/0000265 A1* | 1/2017 | Gross .................. A47C 21/046 |
| 2018/0020842 A1 | 1/2018 | Wang et al. |

FOREIGN PATENT DOCUMENTS

| | | | |
|---|---|---|---|
| CN | 102259606 A | 11/2011 | |
| DE | 102017000649 A1 | 7/2018 | |
| EP | 2789270 A1 | 10/2014 | |
| FR | 1072989 A | 9/1954 | |
| RU | 37984 U1 | 5/2004 | |
| WO | 2015012859 A1 | 1/2015 | |
| WO | WO-2018030689 A1 * | 2/2018 | ............. A47C 21/04 |

* cited by examiner a)

b)

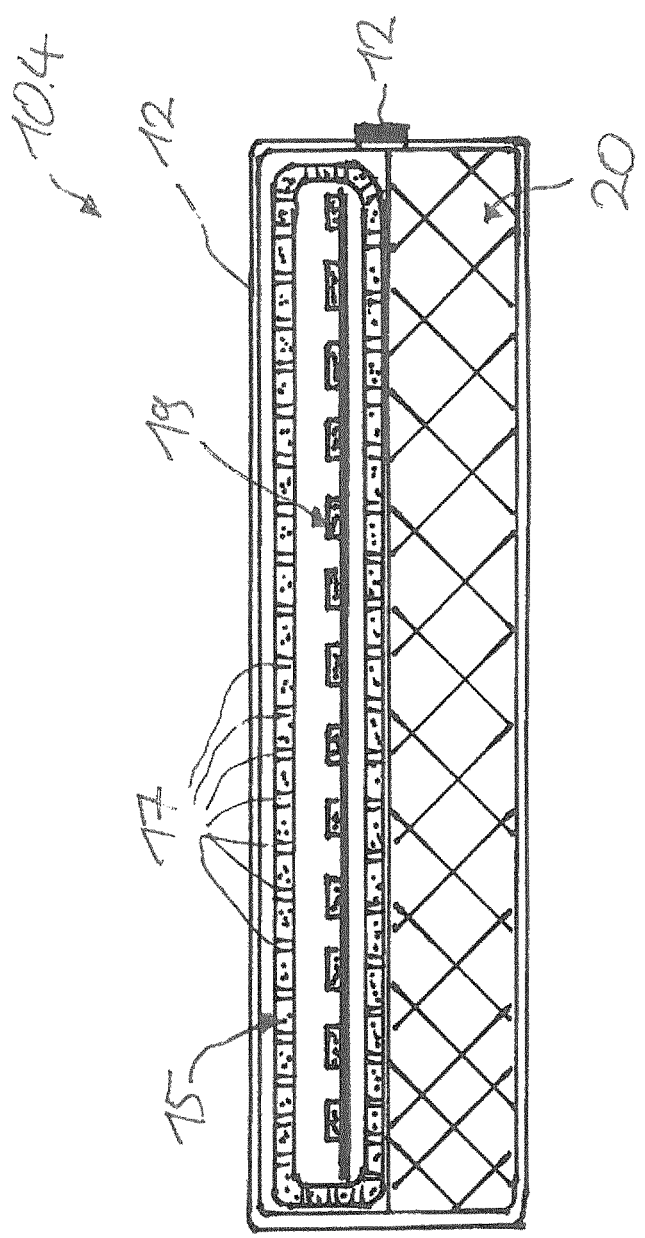

UPHOLSTERY DEVICE

CROSS-REFERENCE TO RELATED APPLICATION

This application is a national stage application, filed under 35 U.S.C. § 371, of International Patent Application No. PCT/EP2020/052574, filed on 2020 Feb. 3, which claims the benefit of European Patent Application No. 19155596.0, filed 2019 Feb. 5.

TECHNICAL FIELD

The present disclosure relates to a padding device such as a padding support, padding cushion or the like, having a top side, a bottom side, and side walls which encircle an outer periphery between the top side and the bottom side, and having a covering layer which surrounds the top side, the side walls and the bottom side, and a padding layer which is arranged under the top-side covering layer.

BACKGROUND

DE 10 2017 000 649 A1 discloses a pad for use in areas with high humidity, featuring a first laminate having a water-resistant covering. On the bottom side and/or top side of the first laminate there are ventilation cutouts which form a ventilation structure. Additionally present is a second laminate, with the first laminate having a higher level of hardness than the second laminate, and with the first laminate and/or the second laminate having continuous ventilation passages. A pad of this kind offers good lie comfort and exhibits good drying properties, which counteract formation of mold or bacteria in long-term use.

U.S. Pat. No. 4,980,936 A describes a flexible foam pad for use in the outdoor sector. On the pad there are deepening embossments on the top and/or bottom side, forming channel-like or grid-like structures on the surface of the pad. These structures have sloping side walls, leading to an increase in the resilience and hence enhanced padding effect. The structures are additionally arranged in such a way that the free convection of air, particularly on the bottom side of the pad when the top side is under load, is very largely prevented, with the consequence that people using the pad as an underlay (for sleeping, for example) do not lose body heat. This is achieved by virtue of the structures having a chamber-like configuration. The structures, moreover, are configured in such a way that when the pad is rolled up or folded up, the structures engage with one another, allowing the pad to be compressed in a space-saving way.

US 2004/0237206 A1 describes a cushion pad with two layers of elastic foam which differ in their levels of hardness. Both layers have cutouts through them from top to bottom, arranged in a predefined orthogonal grid.

The performance of a seating pad is based, fundamentally, on the interaction of covering, underneath upholstery, and the connecting structures. At the same time it is necessary, especially in the case of use in the maritime outdoor sector for boats and yachts, for complex requirements to be made in relation to processing, saltwater serviceability, and comfort. In the case of the known, standard seating pads used at present, the formation of condensation in the interior of the pad and/or the inadequate drying off are constantly recurring problems, with the possible consequences, for example, of development of mold and an adverse effect on long-term reliable functionality, plus a visually negative appearance. The comfort suffers above all in the evening hours, since, as the air becomes cooler, the seating pad or padding device likewise cools down and becomes damp. This leads to the problem that the atmospheric moisture begins to condense, in the seating pad as well, as soon as the ambient temperature drops. Since a seating pad cannot be given a completely impervious configuration, the moisture gets into the seating pad at the closure or at the seams. The known foam used to date absorbs the resulting moisture in the interior and hence affords a good nutrient base for algae, fungi and bacteria of all kinds, leading to rotting and malodor in the interior of the pad and significantly restricting its functionality.

A further factor is that the known seating pads are almost impossible to recycle, as the foams used, with a high polyurethane (PU) fraction, have only limited recyclability, owing to the need, with known seating pads, for the assembly of materials to be chemically separated for this purpose, which entails high costs. Furthermore, the foams used to date are subject in use to chemical and aging-related processes of decomposition, destroying the base matrix of the foam used. This decay is additionally promoted by sebum, perspiration exposure and exposure to light. All these factors mean that reutilizing the material is virtually impossible.

SUMMARY

An object on which the present disclosure is based, or the technical problem addressed, is that of specifying a padding device of the type mentioned in the introduction that ensures a durably reliable function, gives an assurance of high sitting/lying comfort, prevents mold and bacteria infestation even when used in harsh, damp environmental conditions, particularly in the maritime sector, and at the same time counteracts long-term soaking of the interior of the padding device due to rainwater, water splashing or formation of water condensation, thus having quick-drying properties.

The padding device of the invention is provided by the features of independent claim 1. Advantageous embodiments and developments are subjects of the claims dependent directly or indirectly on independent claim 1.

The padding device is distinguished accordingly in that at least the top side of the covering layer is of light-permeable configuration, at least the top side of the padding layer is of light-permeable configuration, a heat-absorbing, in particular flexible, absorber layer is arranged at least in certain regions, more particularly over the full area, below the padding layer, and a solar thermal storage layer, which is operatively connected to the absorber layer and which comprises phase change material, so-called PCM material, is arranged below or above the absorber layer, or a functional layer having a solar thermal storage layer composed of integrated, solar thermal phase change material, so-called PCM material, is configured at least in certain regions, more particularly over the whole area, below the padding layer, the functional layer comprising in particular an absorber layer.

One particularly advantageous embodiment of a padding device, which enables economic production, permits reliable positioning of the functional layer within the padding device, and ensures a durably reliable function, is distinguished in that the padding layer is formed firstly by the top side of a padding mantle which additionally surrounds the functional layer, meaning that the functional layer is arranged within the padding mantle.

One particularly preferred embodiment of the padding device is distinguished in that an insulation layer or the bottom side of the padding mantle is arranged below the solar thermal storage layer or below the functional layer.

One particularly advantageous development which enables air convection within the padding device and counteracts formation of water condensation is distinguished in that the padding layer/padding mantle has perforations.

One particularly preferred advantageous development of the padding device is distinguished in that the padding layer is configured as a 3D knitted spacer fabric or knitted spacer textile fabric or as a 3D laid fiber structure and/or the insulation layer is configured as a single-layer or multilayer nonwoven or as a 3D knitted spacer fabric or knitted spacer textile fabric or 3D laid fiber structure.

With the padding device, a solar thermal lying or seating pad with storage of heat is provided in which the air can circulate, rays of light can penetrate, in order to provide the PCM material with an energy charge, with the padding device delivering heat to its surface under change in load or when subjected to pressure, and so warming up said surface. At the same time, the air can circulate, in order to prevent wetness accumulating and also infestation by mold and bacteria, this being supported by the delivery of heat by the PCM material.

The inventive configuration of the padding layer and/or insulation layer as a knitted spacer fabric or 3D laid fiber structure has the advantage that it accumulates less moisture and is permeable to air and light. The air permeability is advantageous because the heat from the PCM store can rise to the top side of the padding device. The light permeability of the padding layer/insulation layer as knitted spacer fabric or 3D laid fiber structure ensures that the thermal radiation also reaches the absorber layer and/or the functional layer. The thickness of the padding layer may be situated, for example, in the range between 2 to 10 cm, more particularly in the range between 2 to 5 cm. The padding layer/insulation layer may also have a multilayer configuration.

In order to improve the transparency of the padding layer configured as a 3D knitted fabric, the top layers of the knitted fabric, normally configured as multifilaments, are configured as monofilaments.

The constructional configuration of the storage layer may in accordance with the invention take place in different variations of the incorporation of the PCM material within the layer.

One particularly preferred first embodiment is distinguished in that the storage layer/functional layer is configured as a single-layer or multilayer PCM knit.

Another particularly preferred embodiment is distinguished in that the storage layer/functional layer has closed cavities into which PCM material, more particularly pulverulent PCM material, has been incorporated/wrapped.

One particularly advantageous embodiment, which features high energy efficiency and ensures a durably reliable function, is distinguished in that the cavities are configured as closed tube/channel structures which are present in grid-like form, which are arranged in particular between two layers delimiting the cavities, which are filled with PCM material.

Another very advantageous constructional variant, ensuring high energy efficiency and at the same time a durably reliable positioning of the storage layer/functional layer within the padding device, is distinguished in that the cavities are configured as closed nub structures which are present in grid-like form, which are arranged in particular between two layers delimiting the cavities, which are filled with PCM material.

One particularly preferred embodiment for the padding device, which ensures a durably reliable function and ensure reliable positioning of the storage or functional layer within the padding device, is distinguished in that the bottom side of the padding layer has downwardly open, in particular embossed, cutouts which at least in certain regions receive the outer periphery contour of the tube/channel structure or of the nub structure of the storage layer or functional layer, and/or the top side of the insulation layer has upwardly open, in particular embossed, cutouts which at least in certain regions comprise the outer periphery contour of the tube/channel structure or of the nub structure of the storage layer or functional layer.

One particularly preferred embodiment of the padding device, which enables economic and efficient production and implements a high energy efficiency and enables a particularly constructionally simple construction of the padding device in a space-saving way, allowing the further functional layers such as padding layer and insulation layer to be embodied in relation to the desired height and/or thickness, is distinguished in that the storage layer/functional layer has a supporting layer, more particularly a flexible, thin supporting layer, which is configured in an areal or lattice-like manner and on which the PCM material is applied/mounted, in particular in a screenprinting process.

The supporting layer is composed advantageously of plastic, in particular polyester.

In accordance with the invention the areal supporting layer, in one advantageous embodiment, is distinguished in that the supporting layer has flat webs arranged in a grid-like manner with recesses which are present between the webs and which have the peripheral contours determined and predefined by the webs, the recesses being filled areally with the PCM material.

One advantageous alternative embodiment is characterized in that the lattice-like supporting layer is arranged within a PCM material layer.

The absorber layer may be configured as a single-layer/or multilayer nonwoven or woven fabric unit.

One particularly advantageous embodiment, which significantly improves the energy efficiency of the padding device, is distinguished in that the absorber layer/functional layer has a light-absorbing color, in particular a black color. As a result of the black color, the efficient absorption of energy of the absorber layer/functional layer for the purpose of charging the PCM material with energy is optimized.

One particularly preferred embodiment is distinguished in that a spacer layer, with enhanced values in relation to strength, abrasion resistance and air permeability is used below the insulation layer.

An advantageous further embodiment of the padding device, which ensures a durably reliable functionality, is distinguished in that the covering layer is configured as a woven fabric layer, in particular composed of textile fibers or plastics fibers, and is coated on the top side with light-permeable material, in particular with silicone or plastic, in particular polyurethane, the coating composed of the stated materials being configured such as to ensure maximum light permeability.

One particular embodiment for increasing the energy efficiency is distinguished in that the knitted spacer fabrics of the polyester layer and/or insulation layer have at least one top layer, more particularly two top layers arranged on top and bottom sides, which are formed from monofilaments.

In the case of the padding device, downward or upward drains are possible in principle with regard to the outward draining of the deposits and/or collections of water arising within the padding devices, because of environmental effects, in order to prevent formation of mold and/or bacteria.

An advantageous and preferred embodiment of a fundamentally different kind is distinguished in that the covering layer is configured as a membrane layer which, on the one hand, is of watertight configuration, such that no water can penetrate into the interior of the padding device and which, on the other hand, is vapor-permeable, such that vapor produced during heating can diffuse toward the outside, or a membrane layer of this kind is arranged separately under the covering layer, such that no moisture whatsoever can penetrate into the padding device. In that case any closing and/or opening mechanisms of the covering layer must also be watertight.

One preferred development is distinguished in that the storage layer/functional layer is surrounded at least on the top side, or on the top and bottom sides, by a water-impermeable but vapor-permeable membrane layer.

Another advantageous implementation variant of the padding device, particularly in relation to the layered construction of the functional layers, is that the absorber layer is arranged both above and below the storage layer.

Through the padding device it is possible for example to use a solar thermal lying and seating pad with a latent heat store, this pad possessing significantly enhanced quality of comfort by comparison with the known padding devices. During the day, the radiation energy of the sun is stored by the solar collector or the functional layer with solar thermal phase change material. In the evening hours, this heat in the interior of the pad is delivered to the surface of the pad as well, so giving rise to considerable seating and/or lying comfort. Moreover, the air circulates in the interior of the pad, so counteracting wetness and also mold and bacteria infestation.

All in all, the multi-layer construction ensures high comfort. Utilization of the solar thermal process prevents the pad becoming wet through. The PCM material provides delayed heating-up and long-lasting heating of the padding device, with corresponding drying effect and sitting and lying comfort.

In place of the usual PU foam as padding layer, the invention uses a knitted spacer fabric or knitted spacer textile fabric which ensures air circulation. By virtue of the construction according to the invention, the padding device ensures an eco-friendly and sustainable process of production and reutilization.

The padding device can be employed in numerous sectors, such as in the maritime sector or camping and/or leisure sector, for example.

Further embodiments and advantages of the invention are apparent from the features further listed in the claims and also from the exemplary embodiments specified below. The features of the claims may be combined with one another in any desired way, provided they are not obviously mutually exclusive.

BRIEF DESCRIPTION OF THE DRAWINGS

The invention and also advantageous embodiments and developments thereof are described in more detail and elucidated below with reference to the examples depicted in the drawing. The features apparent from the description and the drawing may be employed individually by themselves or as two or more thereof in any desired combination in accordance with the invention. In the drawing

FIG. 9 shows a highly schematized cross section through a fourth exemplary embodiment of a padding device, in which the functional layer with the PCM material is surrounded by a padding mantle.

DETAILED DESCRIPTION

Figure 1:
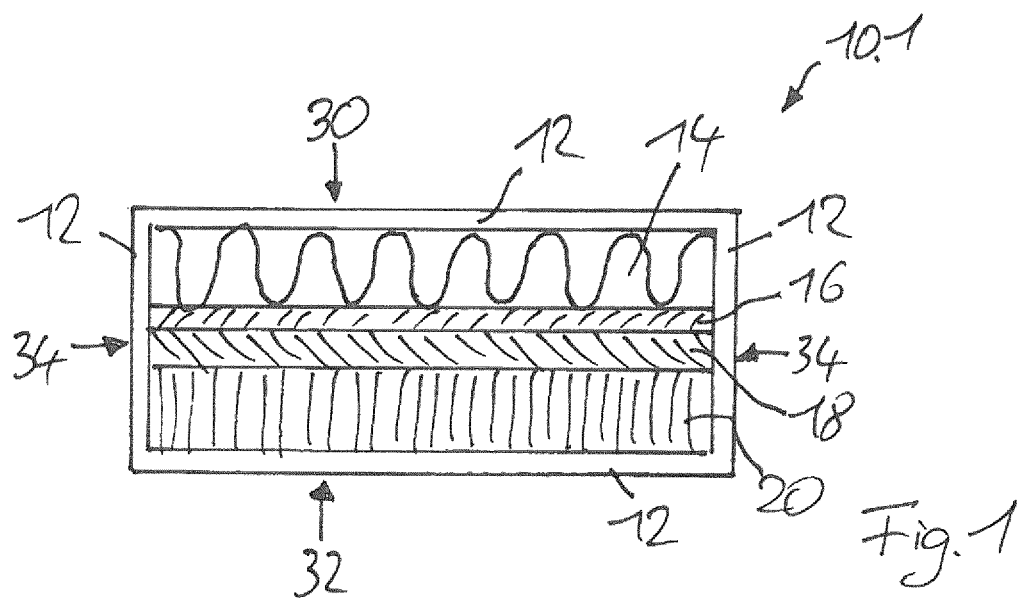
FIG. 1 shows a high schematized representation of a first exemplary embodiment of a padding device in cross section, with a covering layer surrounding the padding device and having the following functional layers present within the padding device and surrounded by the covering layer: a padding layer, an absorber layer, a solar thermal storage layer, an insulation layer.

In a first exemplary embodiment of a padding device 10.1, according to FIG. 1, a cross section is shown with the following construction of the padding device 10.1: The padding device 10.1, which is cuboidal in cross-sectional configuration in the exemplary embodiment, has a top side 30, a bottom side 32, and side walls 34 which encircle a periphery.

The top side 30, bottom side 32 and side walls 34 are surrounded over the entire periphery by a covering layer 12, which on the inside has a layered construction from top to bottom with the following functional layers:

Below the top-side covering layer 12 is a padding layer 14, below which an absorber layer 16 is arranged.

Not only the top side of the covering layer 12 but also the padding layer 14 is of light-permeable configuration. As a result it is possible for rays of light to strike the absorber layer 16, which absorbs their heat energy and delivers it to a solar thermal storage layer 18 situated beneath. The solar thermal storage layer 18 has so-called PCM material (phase change material) which, when subjected to heat energy, stores this energy and delivers it again as and when required. The heat energy is delivered, for example, by subjection of the material to pressure.

Arranged below the storage layer 18 is an insulation layer 20, which provides downward insulation of the heat-delivering storage layer 18.

Concluding the outer periphery of the padding device 10.1, below the insulation layer 20, is the covering layer 12.

Figure 2:
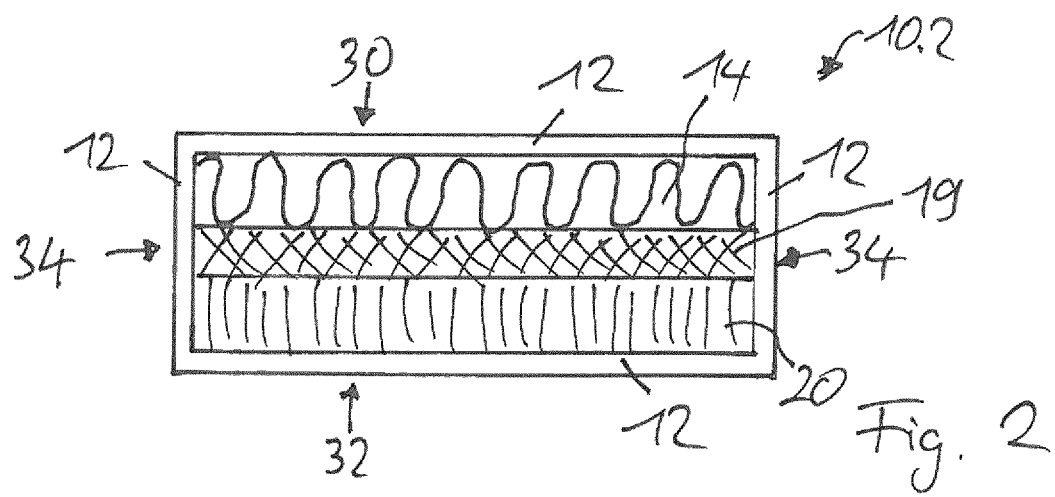
FIG. 2 shows a highly schematized representation of a second exemplary embodiment of a padding device in cross section, having an operational layer surrounding the padding device and having the following functional layers present within the padding device: a padding layer, a functional layer, which integrally has the properties of an absorber layer and of a solar thermal storage layer, and an insulation layer.

A second exemplary embodiment of a padding device 10.2 is depicted in FIG. 2. This exemplary embodiment differs in its fundamental construction from the exemplary embodiment according to FIG. 1 in that the absorber layer 16 and the solar thermal storage layer 18 are integrated in a functional layer 19.

Figure 3:
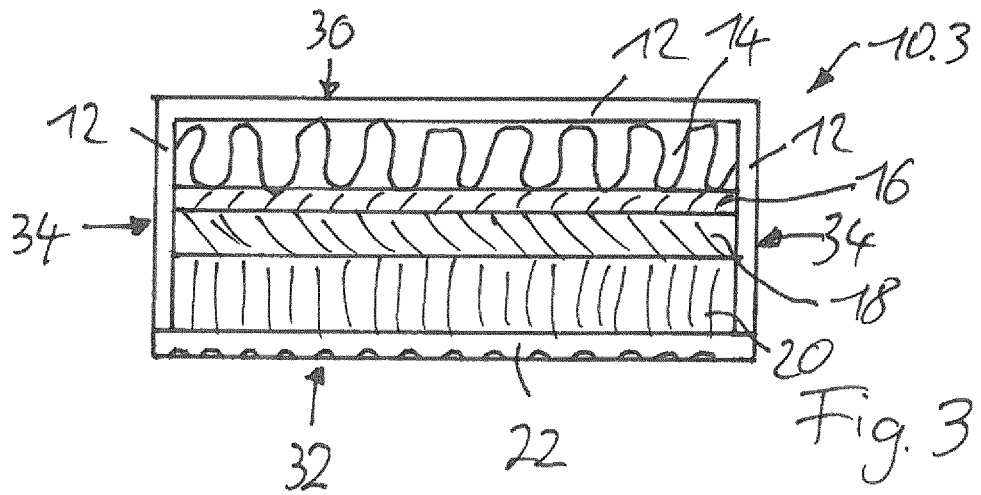
FIG. 3 shows a highly schematized representation of a third exemplary embodiment of a padding device in cross section, according to FIG. 1, with a spacer layer rather than the covering layer arranged on the bottom side of the padding device.

A third exemplary embodiment of a padding device 10.3 is depicted in FIG. 3. This exemplary embodiment differs in its fundamental construction from the exemplary embodiment according to FIG. 1 in that a spacer layer 22 is present on the bottom side 32 instead of the covering layer 12.

In constructional terms, the introduction/application/incorporation/filling of the PCM material into/onto/on the storage layer 18 may be implemented in a wide variety of different ways.

Figure 4:
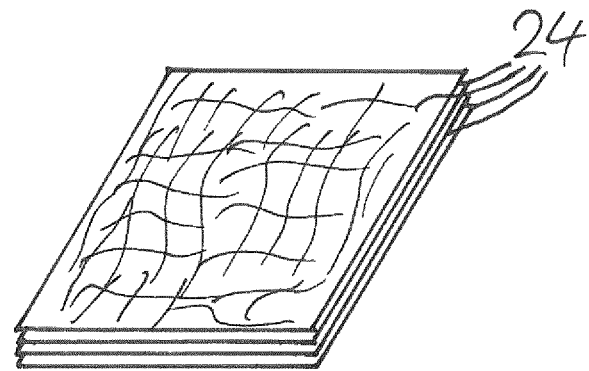
FIG. 4 shows a highly schematized perspective representation of a solar thermal storage layer of the padding device according to FIG. 1, with the storage layer being configured with the PCM material as a multilayer knitted fabric.

According to the exemplary embodiment of FIG. 4, the PCM material is introduced or woven integrally within a nonwoven or knitted fabric 24, and the nonwoven or knitted fabric 24 may also have a multilayer configuration.

Figure 5:
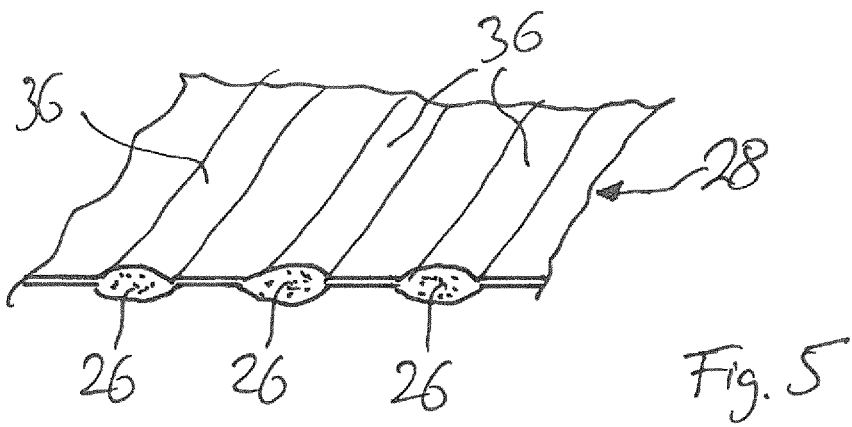
FIG. 5 shows a highly schematized perspective representation of a solar thermal storage layer of the padding device according to FIG. 1, with the storage layer having tube structures filled with the PCM material, FIGS. 6a, b show a highly schematized perspective representation (FIG. 6a) and sectional representation (FIG. 6b) of a solar thermal storage layer of the padding device according to FIG. 1, with the storage layer having nubs filled with the PCM material, FIGS. 7a, b show a highly schematized perspective representation (FIG. 7a) and sectional representation (FIG. 7b) of a solar thermal storage layer of the padding device according to FIG. 1, with the storage layer having a flexible areal supporting layer with webs extending in a grid-like manner and with recesses between the webs, the recesses being filled with the PCM material, FIGS. 8a, b show a highly schematized perspective representation (FIG. 8b) and sectional representation (FIG. 8b) of a solar thermal storage layer of the padding device according to FIG. 1, with the storage layer having a flexible lattice-like supporting layer which is arranged within a PCM material layer.

In the exemplary embodiment according to FIG. 5, the storage layer 18 has an areal tube structure 28 with cavities 26 in which pulverulent PCM material powder has been introduced. The tube structure 28 possesses a plurality of tube units 36 or channel units, which are spaced apart in parallel in a predefined grid spacing and are sealingly surrounded by a top layer and bottom layer.

Figure 6:
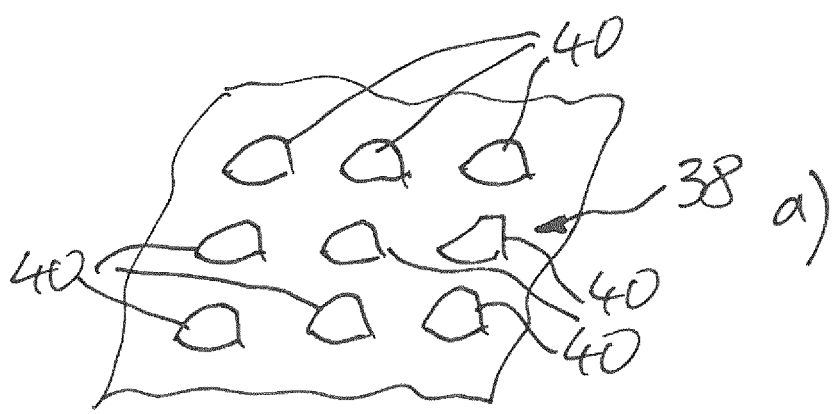
Figure 6:
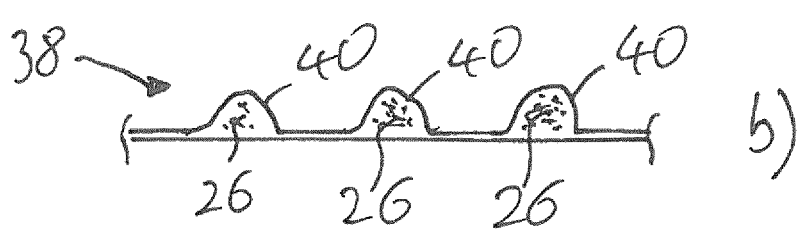

FIGS. 6a, b show a further exemplary embodiment of a form of the storage layer 18, which has a nub structure 28 with nubs 40 in a grid-like arrangement, these nubs being surrounded on the top and bottom sides with a top layer and bottom layer, the internal cavities of the nubs 40 being filled with PCM material.

Figure 7:
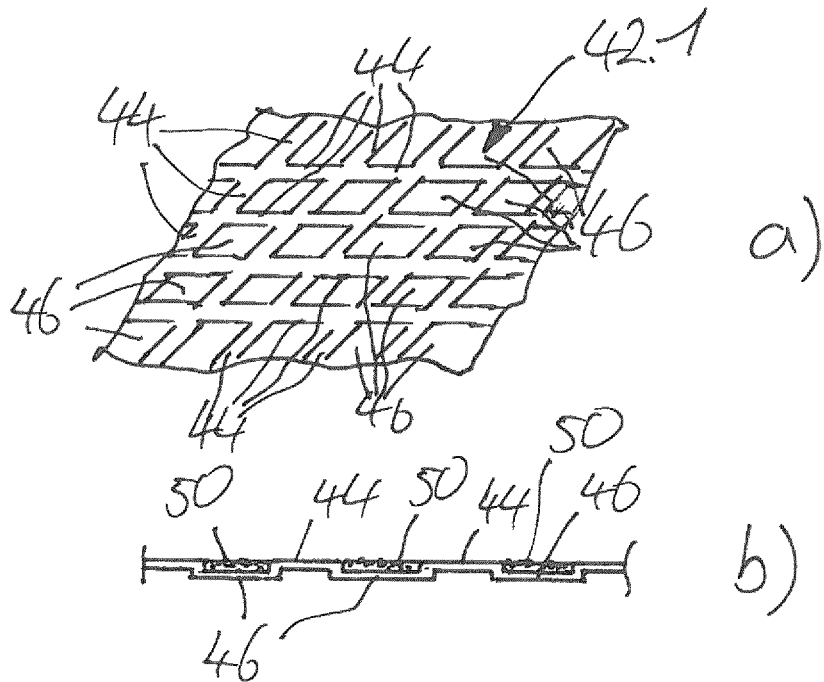
Figure 8:
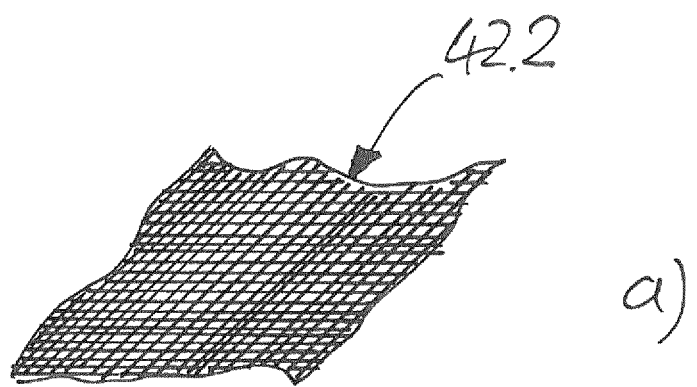
Figure 8:
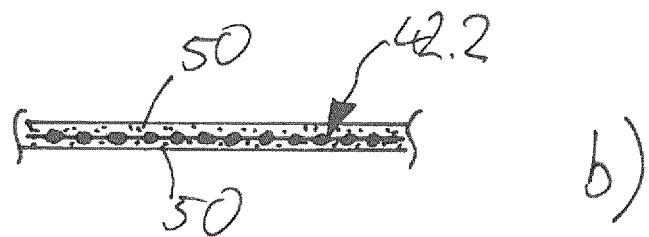

FIGS. 7a, b show an advantageous constructional embodiment, particularly simple to implement, of a storage layer 18, which has a thin, flexible, areal supporting layer 42.1, made of polyester, for example, provided areally with PCM material on the top side. The PCM material may be applied in a screenprinting process, for example. The extremely thin supporting layer 42.1 has webs 44 extending in a grid-like manner, which form, for example, a polygonal or round recess pattern with polygonal or round recesses 46, which are filled up with PCM material. Alternatively, in accordance with FIGS. 8a, b, the supporting layer 42.1 may be arranged as a flexible, thin lattice structure 48 within a thin PCM material layer.

This embodiment is particularly energy-efficient, economically producible, flexible, possesses a thin construction, and can therefore be employed advantageously for the padding device.

FIG. 9 shows a further exemplary embodiment of a padding device 10.4 in cross section, which is likewise surrounded by a light-permeable covering layer 12. Below the top side of the top covering layer 12 is a closed padding mantle 15, which can nevertheless be opened and closed, and in which the functional layer 19 is housed as a storage layer with PCM material. The storage layer used may be, alternatively, the storage layers 24, 28, 38, 41.1 or 42.2 represented in FIGS. 4 to 8. As a result, the functional layer 19 is securely positioned within the padding device 10.4. The padding mantle 15 is likewise light-permeable, at least on its top side, this being implemented in the exemplary embodiment by a perforation pattern 17. Below the padding mantle 15, the insulation layer 20 is configured as a knitted plastic fabric layer. On one side wall, the covering layer 12 has an opening and closing mechanism, which in the exemplary embodiment is configured as a touch-and-close fastening 12.

The invention claimed is:

1. A padding device (10), comprising:
a top side (30), a bottom side (32), and side walls (34) which encircle an outer periphery between the top side (30) and the bottom side (32);
a covering layer (12) which surrounds the top side (30), the side walls (34) and the bottom side (32), a top side of the covering layer (12) being light-permeable;
a padding layer (14) which is arranged under the top-side covering layer (12), a top side of the padding layer (14) being light-permeable; and
a heat-absorbing absorber layer (16) arranged below the padding layer (14) and a solar thermal storage layer (18), which is operatively connected to the absorber layer (16) and which comprises phase change material (PCM material), arranged below or above the absorber layer (16), or
a functional layer (19) having a solar thermal storage layer (24, 28, 38, 42.1, 42.2) composed of integrated, solar thermal phase change material (PCM material) arranged below the padding layer (14).

2. The padding device of claim 1,
wherein the padding layer (14) is formed firstly by the top side of a padding mantle (15) which additionally surrounds the functional layer (19), meaning that the functional layer (19) is arranged within the padding mantle (15).

3. The padding device of claim 2,
wherein an insulation layer (20) or the bottom side of the padding mantle (15) is arranged below the solar thermal storage layer (18) or the functional layer (19).

4. The padding device of claim 3,
wherein the padding layer (14) is configured as a 3D knitted spacer fabric or knitted spacer textile fabric or as a 3D laid fiber structure and/or
wherein the insulation layer (20) is configured as a single-layer or multilayer nonwoven or as a 3D knitted spacer fabric or knitted spacer textile fabric or 3D laid fiber structure.

5. The padding device of claim 4,
wherein the knitted spacer fabrics of the padding layer (14) and/or insulation layer (14, 20) have a top layer which is formed from monofilaments.

6. The padding device of claim 3,
wherein the storage layer (18) or the functional layer (19) has closed cavities into which pulverulent PCM material has been incorporated or filled.

7. The padding device of claim 6,
wherein the cavities are configured as closed tube structures which are present in grid-like form, which are arranged between two layers delimiting the cavities, which are filled with PCM material.

8. The padding device of claim 7,
wherein the bottom side of the padding layer (14) has downwardly open cutouts which receive the outer periphery contour of the tube structure of the storage layer (18) or functional layer (19), and/or
wherein the top side of the insulation layer (20) has upwardly open cutouts which receive the outer periphery contour of the tube structure of the storage layer (18) or functional layer (19).

9. The padding device of claim 6,
wherein the cavities are configured as closed nub structures which are present in grid-like form, which are arranged between two layers delimiting the cavities, which are filled with PCM material.

10. The padding device of claim 9,
wherein the bottom side of the padding layer (14) has downwardly open cutouts which receive the outer periphery contour of the nub structure of the storage layer (18) or functional layer (19), and/or
wherein the top side of the insulation layer (20) has upwardly open cutouts which receive the outer periphery contour of the nub structure of the storage layer (18) or functional layer (19).

11. The padding device of claim 3,
wherein a spacer layer (22) is arranged below the insulation layer (20).

12. The padding device of claim 2,
wherein the padding layer (14) and/or the padding mantle (15) has perforations.

13. The padding device of claim 1,
wherein the storage layer (18) or the functional layer (19) is configured as a single-layer or multilayer PCM knit.

14. The padding device of claim 1,
wherein the storage layer (18) or the functional layer (19) has a flexible supporting layer, which is configured in an areal or lattice-like manner and on which the PCM material is applied and/or mounted.

15. The padding device of claim 14,
wherein the supporting layer is composed of polyester.

16. The padding device of claim 14,
wherein the areal supporting layer has webs arranged in a grid-like manner with recesses which are present between the webs and which have the peripheral contours determined and predefined by the webs, the recesses being filled areally with the PCM material.

17. The padding device of claim 14,
wherein the lattice-like supporting layer is arranged within a PCM material layer.

18. The padding device of claim 1,
wherein the absorber layer (16) is configured as a single-layer/or multilayer nonwoven or woven fabric unit.

19. The padding device of claim 1,
wherein the absorber layer (16) or the functional layer (19) has a black color.

20. The padding device of claim 1,
wherein the covering layer (12) is configured as a woven fabric layer or carrier layer composed of textile fibers or plastic fibers, and is coated on the top side with light-permeable silicone or polyurethane.

21. The padding device of claim 1,
wherein the covering layer (12) is configured as a membrane layer which, on the one hand, is watertight, such that no water can penetrate into an interior of the padding device (10) and which, on the other hand, is vapor-permeable, such that vapor produced during heating can diffuse toward an outside, or under the covering layer (12) a membrane layer of this kind is arranged separately under the covering layer (12), such that no moisture whatsoever can penetrate into the padding device.

22. The padding device of claim 1,
wherein the storage layer (18) or the functional layer (19) is surrounded at least on the top side, or on the top and bottom sides, by a water-impermeable but vapor-permeable membrane layer.

23. The padding device of claim 1,
wherein the absorber layer (16) is arranged both above and below the storage layer (18).

* * * * *